United States Patent [19]
Spiller et al.

[11] 3,810,513
[45] *May 14, 1974

[54] MOTOR VEHICLE WITH TWO DRIVING UNITS, ESPECIALLY FOR AGRICULTURAL PURPOSES

[75] Inventors: Richard Spiller, Bensberg; Gottfried Moser, Gergisch-Gladbach; Walter Berthold, Schildgen, all of Germany

[73] Assignee: Klockner-Humboldt-Deutz Aktiengesellschaft, Cologne-Deutz, Germany

[ * ] Notice: The portion of the term of this patent subsequent to Sept. 11, 1989, has been disclaimed.

[22] Filed: Apr. 10, 1972

[21] Appl. No.: 242,696

Related U.S. Application Data
[62] Division of Ser. No. 843,104, July 18, 1969, Pat. No. 3,690,395.

[30] Foreign Application Priority Data
July 21, 1968 Germany.................... 1780052

[52] U.S. Cl.................. 172/114, 172/292, 172/439
[51] Int. Cl............................................ A01b 51/00
[58] Field of Search.......... 178/7, 9, 439, 114, 292; 180/6.48, 51, 77, 62, 53; 280/461 A, 408

[56] References Cited
UNITED STATES PATENTS
| | | | |
|---|---|---|---|
| 3,690,395 | 9/1972 | Spiller et al...................... | 180/6.48 |
| 2,320,141 | 5/1943 | Kott................................. | 280/461 A |
| 3,334,702 | 8/1967 | Granryd........................... | 180/51 |

*Primary Examiner*—Stephen C. Pellegrino
*Attorney, Agent, or Firm*—Walter Becker

[57] ABSTRACT

A vehicle, especially adapted for agricultural use, and having two engines in coaxial alignment in a frame and adapted for coupling together. Each engine drives the primary part of a torque transmitting arrangement, electrical or hydraulic, and secondary parts of the torque transmitting arrangement are connected to drive the vehicle wheels. Controls are provided to control the distribution of power from the primary parts to the secondary parts to determine the wheel, or wheels, to receive the power and the speed of rotation of the wheels. At both ends of the vehicle there are provided means for connection of implements to the vehicle and including lift type hitches and power take-off shafts.

7 Claims, 21 Drawing Figures

MOTOR VEHICLE WITH TWO DRIVING UNITS, ESPECIALLY FOR AGRICULTURAL PURPOSES

This is a division of co-pending application S. N. 843,104 Spiller et al., filed July 18, 1969, now U. S. patent number 3,690,395.

The present invention relates to a motor vehicle with two driving units, especially for agricultural purposes. More specifically, the present invention concerns a motor vehicle comprising two driving units each of which has a driving machine, a torque converter variable as to its transmission ratio and two driving wheels. These driving units are by means of a joint arranged between said two units coupled to each other by means of a horizontal pivot shaft extending parallel to the central longitudinal axis of the vehicle, each of the free end faces having a device for connection with an implement.

In agriculture the farmer frequently is faced with the problem of economically tilting or working large areas by means of motor vehicles. For this purpose heretofore many tractors are employed which are designed as sole agricultural implement pulling tractors, so-called standard tractors which have two rear driving wheels and two guiding wheels located opposite to said driving wheels and having a smaller diameter than the latter. These guiding wheels are in exceptional instances likewise designed as driving wheels. Such agricultural motor vehicles, however, are suitable only to work the soil in a one-man operation, for instance, for plowing, cutting and the like with the tractor working as pulling machine. Such motor vehicles, however, are not suitable for economically working large areas and furthermore lack the possibility of carrying out in one-man operation a seeding, planting harvesting and similar activities while being able to cover large areas. For such purposes, it would be necessary that the implements to be connected to the driving machine will have to be pushed. Since on the basis of the pure pulling operation, the driver's seat with these known motor vehicles is arranged above or in the vicinity of the rear driving axle, the viewing conditions for devices or implements to be connected to the front of the machine are unsatisfactory. In addition thereto, tractors with a rear driving axle with two driving wheels and a front axle in which the guiding wheels have a smaller diameter than the driving wheels are not suitable to move an implement similar to a pulled soil-working implement to push over the ground to be worked while assuring a high machine output. This is due to the fact that the overall center of gravity of the implement and of the tractor will, in view of the driving machine located in front of the driving axle in series with the torque converter, act unfavorably upon the small wheels. In addition thereto, tractors with a high driving output have the drawback that the driving machine cannot be taken from a series of driving machines produced for smaller or medium tractors.

For the above reasons, in connection with harvesting operations it has been suggested to combine the motor vehicle with the harvesting machine, for instance, a mowing thresher, corn harvester, beet harvester and the like so as to obtain a self-propelling implement. Such self-propelling implements, however, have the serious drawback that in most instances they are not economical because they are used only for a relatively short period during the specific harvesting season. Furthermore, such machines will, for a farm which is not limited to one type of crop, represent a capital investment which is not economical because motor vehicles will have to be purchased which are intended for various harvesting purposes and the driving machines and torque converters of which are used to a different extent and not sufficiently economically.

On the other hand, for carrying out seeding and cultivating operations, motor vehicles have been developed with a frame for connection of implements in front or at the side of a rear driving axle which frame makes it possible in front of the steering axle as well as in front of the driving axle to provide the arrangement of a plurality of special devices. These motor vehicles, however, have the drawback that the special devices or implements to be connected thereto have as to structure, size and coupling elements to be designed in conformity with the supporting frame and thereby the specific motor vehicle. Moreover, the connection and disconnection of such special devices to and from the motor vehicle is rather time-consuming. Moreover, there exists the further drawback that in view of the provided one-man operation a certain size of the special implements to be connected to the supporting frame must not be exceeded. Consequently, the driving output as well as the dimensions associated with such motor vehicle are limited so that a genuine one-man operation is unable to cover large areas in an economical time.

For purposes of working larger areas, endeavors have been made for the pure pulling operation by coupling two tractors of an intermediate output together and omitting the front axles to arrive at larger tractors which will be able to pull relatively large ground-working implements. Thus, there has become known a motor vehicle described in the Eastern German Pat. No. 42,380, according to which the two driving units of two standard tractors are combined and the driving machines with their driving housings are connected to each other while having one axle drive for each two driving wheels. The two tractor driving units are further by means of the rear portions of their drive housings coupled to each other by a cross joint which has two vertical and one horizontal pivot shaft, said horizontal pivot shaft extending parallel to the central longitudinal axis of the vehicle. While it is possible with a motor vehicle of this construction with a shorter wheel space to convey a larger driving output onto the ground than is possible with a standard tractor, this heretofore known motor vehicle, however, in view of its basic conception similar to the standard tractor is suitable only for the pulling of ground-working implements. This is due to the fact that the driving machines of both driving units protrude on that side which is remote from the cross joint to a considerable extent beyond the associated driving axle at the end face and thus interfere with the observation of the driver toward the front and block the required free space between the guiding elements of the two devices for the implements. This brings about the drawback that the device for receiving the implements cannot be designed as a standard three-point supporting device because the driving machine interferes with the necessary additional devices on the machine and in particular with the assembly at the end face of a standard power lifter with control device as well as with a stud shaft depending on the motor speed. Consequently, the heretofore known motor vehicle with two devices for connection with implements on the end face is suitable for pulling operations only through the intervention of two lower guiding members. Even more important than the drawbacks set forth above, this motor vehicle has the drawback that with the simultaneous installation of a pushed and a pulled implement in view of the driving machine masses protruding beyond the driving axles, a balance variation occurs which is unsuitable for such operation. This balance variation is brought about by the distribution of the relatively widely spaced centers of gravity so that the possibility is lacking to convey the machine output of both driving units in an undisturbed manner and at a full magnitude through the driving wheels onto the ground. For the above mentioned reasons, the above outlined motor vehicle is likewise not suitable for the simultaneous connection of equal or subdivided harvesting machines and cultivating and ground-working devices.

Based on the above findings, it is an object of the present invention to provide an agriculturally useful motor vehicle of the above mentioned general type which will be able with a short wheel base, a minimum structural length and favorable overall center of gravity to make possible for the overall vehicle as well as for each of the two driving units a maximum surface working when connecting thereto implements or machines while carrying out the working operation as a genuine single operator operation.

It is another object of this invention to provide an agriculturally useful motor vehile which will make it possible particularly with simultaneously pulling and pushing operations of ground-working implements, cultivating and harvesting machines to take advantage of the full driving output of both driving machines.

These and other objects and advantages of the invention will appear more clearly from the following specification in connection with the accompanying drawings, in which.

The motor vehicle according to the present invention is characterized primarily in that of the two driving units, the driving machine and the primary part of the torque converter are arranged in superimposed position, and that the joint center of gravity of drive, machine and torque converter is located in or near one of the vertical planes passing through the center of the two associated driving wheels. Such a structure makes it possible that even with unfavorable ground conditions, which result with a simultaneously pulling and pushing motor vehicle, especially when working the ground, none of the two driving units can produce a rearward turning mass moment which relieves the other driving unit. This in turn results in a reduced wear of the horizontal joint for the power transfer of the individual driving wheels to the ground and brings about the important advantage that with unfavorable road conditions an almost slip-free power transmission will be possible. Furthermore, in view of the structure of the motor vehicle according to the invention, there is provided the possibility to install into each of the two driving units a high output driving machine which may have been produced for other installation purposes in series, without interfering with the connection at the end face of a device with power lifter for receiving implements and further coupling elements and auxiliary drives such as stud shafts and other power connections. A motor vehicle according to the invention thus creates the possibility economically to work large areas of ground.

For purposes of making the length of the motor vehicle as short as possible, it is suggested according to the invention that each torque converter comprising a primary and secondary part, at least the primary part is arranged above the driving machine, and that the common center of gravity of torque converter and driving machine is located in or near a vertical plane passing through the center of the two associated driving wheels. Since with such an arrangement a certain free space will remain above the driving machine and within the length of said driving machine, it will be possible with a motor vehicle having a power lifter at an end face, advantageously to arrange the power lifter within the said free space.

Within the framework of the present invention, there also exists the possibility of arranging each driving machine in a manner known per se above the torque converter pertaining thereto or when a torque converter is involved comprising a primary and secondary part, to arrange each driving machine at least over the primary part. The common center of gravity of driving machine and torque converter is in conformity with the invention located in or near a vertical plane which extends through the center of the two associated driving wheels. Such a structure has the advantage that the remaining free space below the driving machine at the end face side can be used for plug and socket connections or clutch arrangements without interference with other devices.

If, with the motor vehicle according to the invention, the crankshaft of each driving machine is located parallel to the central longitudinal axis of the vehicle, a simple power transfer from the driving machine to the associated torque converter can with a short vehicle length be realized by arranging the driving members between each driving machine and the torque converters associated therewith on that end face of the driving units which faces the joint. This brings about the advantage that the housing parts of the driving members can be used simultaneously as bearing and supporting elements for the horizontal bearings so that a frameless construction of the vehicle will be possible. With the motor vehicle according to the invention whose driving wheels are arranged on the driving units in an axle-rigid manner, it is advantageous in order to obtain small turning radii that the joint between the two driving units is in a manner known per se provided in addition to the horizontal pivot axis, with a vertical pivot axis, and furthermore that the vertical pivot axis is arranged in or near the center between the two driving units. Within the framework according to the invention, it is also possible with a motor vehicle according to the invention to design the driving wheels of each driving unit so that they can be steered.

If, with the motor vehicle according to the invention, each of the torque converters represents a hydraulic or electric torque converter, it is possible according to a further development of the invention that each of the torque converters has two secondary parts each of which has associated therewith a driving wheel. In connection therewith, it is expedient to arrange the secondary part of each of the torque converters in or on the driving wheels.

For balancing the output of two driving machines, it is furthermore advantageous to provide that the two driving machines may selectively be coupled to each other. A further possibility of an advantageous power exploitation of both driving machines is possible under certain conditions of operation by feeding the output of both driving machines selectively together into or to the primary part of each of the torque converters. In certain individual cases, for instance, when working muddy ground, it is furthermore expedient that the output of each of the two driving machines may be selectively superimposed together into the secondary parts of one or two driving units. In particularly critical cases or situations, for instance, when working the ground of steep areas, the present invention makes it possible to feed the output of the two driving machines selectively together or separately into one of the secondary parts of each of the torque converters.

For a simultaneous pulling and pushing ground working with the motor vehicle it is advantageous for the vehicle that the output of both driving machines is selectively separated or superimposed upon and fed into the secondary parts pertaining to one vehicle side. In addition thereto, when employing the motor vehicle with an implement which is non-symmetrically pushed relative to the pulled device that the output of both driving machines is selectively separated or in a superimposed manner is fed into the secondary parts associated with the diagonally oppositely located driving wheels.

According to a further development of the invention, it is provided for the motor vehicle that the vertical pivot shaft is formed of two bearings the base of which is located within the structural height resulting from the primary part of the torque converter and the driving machine and that the power transmitting means between the two driving units are passed through the free space between the two vertical bearings.

For purposes of creating favorable safety conditions for the driver it is furthermore advantageous that in or in the vicinity of the center between both driving units, preferably through the joint, there is provided a driver's stand for controlling both driving units. A simple construction will be obtained when the driver's stand is connected to the upper bearing of the vertical pivot shaft. For the pushing and the pulling ground working it is advantageous if the driver's stand or his panel with seat is rotatable about a vertical axis. The vertical pivot shaft of the driver's stand or of the seat may be arranged concentrically with regard to the vertical pivot shaft of the joint. It is advantageous for certain cases of employment of the motor vehicle that the driver's stand is displaceable transversely with regard to the longitudinal central plane of the vehicle.

For purposes of selectively removing or connecting common or separate implements to be connected to a corresponding holding device of the driving machine it is provided in conformity with a further development of the invention that each of the two driving units have those end faces thereof which face away from the joint provided with a hydraulic power lifter for lifting and lowering the associated implement to be connected to the driving machine. Provided that the torque converter is arranged above the driving machine, it is advantageous for creating most favorable conditions of viewing the area in front and laterally of the driving machine and for an unimpeded connection of the working implements to have the structural height of each of the two hydraulic power lifters substantially equal or less than the structural height of the end face of the associated primary part of the torque converter which faces away from the respective implement connecting device. If with the motor vehicle according to the invention the torque converter is arranged below the driving machine, it is likewise advantageous for creating favorable safety conditions and an unimpeded connection of implements if the structural height of each of the two hydraulic power lifters is substantially equal or less than the structural height of that end face of the associated driving machine which faces toward the respective implement connecting device.

For purposes of connecting certain devices or parts thereof to the implement connecting device, such as a mowing unit or beet or potato harvesting machine, it is provided according to the present invention that each end face of the two driving units which faces away from the joint, comprises a coupling device adapted to be lifted and lowered and rigidly to connect the respective implement to the implement connecting device. In this connection it is expedient that the implement coupling for the said rigid connection comprises two catching members guided on the crank arms in a horizontal plane in spaced relationship to each other. In this connection it is assumed that each of the hydraulic power lifters associated with one driving unit has two lifter arms arranged in a horizontal plane in spaced relationship to each other for lifting and lowering the implement connecting device. For using the lifter arms for two-fold purposes, the lifter arms should be coupled to the crank arms carrying the catching members, through the intervention of lifter rods or the like which are preferably adjustable as to their length. For purposes of obtaining a simple journalling it is furthermore advantageous to have the crank arms supporting the catching members journalled in or on the housing of each power lifter associated with the driving units.

For driving implements to be connected to or suspended on the machine, it is furthermore suggested that each of the end faces of each driving unit, which end faces face away from the joint, has a stud shaft. With motor vehicles of this type in which the drive of each of the two stud shafts is effected in conformity with the output speed of the associated driving machine, it is advantageous for purposes of obtaining synchronism of the stud shafts that these stud shafts are adapted selectively to be coupled to each other in order with a motor vehicle in which the drive of the stud shaft associated with each driving unit is effected in conformity with the driving speed, likewise to obtain synchronism, the stud shafts should be adapted selectively to be coupled to each other.

Inasmuch as with a motor vehicle according to the present invention there is created the possibility to drive at the same speed forwardly as well as rearwardly and thus to make possible a pulling operation in each driving direction when driving in streets or terrain, it is furthermore suggested that each of the end faces of the two driving units which end faces face away from the joint comprises a stationarily arranged coupling or clutch below the hydraulic power lifter. In order to be able by means of the motor vehicle according to the invention to operate conventional ground working implements in pulling operation when driving in either direction, it is suggested in conformity with the invention that each of the two driving units below the said stationary coupling has a pulling pendulum protruding beyond the end face and pivotable preferably in a horizontal and vertical plane while being adjustable as to its length.

With a motor vehicle according to the invention which for the hydraulic or electrical drive of a connected or suspended implement has one or more pumps or generators driven by the driving machine or machines, it is provided for purposes of obtaining a simple power transfer that each of the end faces of each driving unit which end faces face away from the joint, and/or each vehicle side has a hydraulic or electric power plug or the like connection.

For purposes of further eliminating back turning mass moments which relieve the driving units with regard to each other it is suggested for the power supply to the driving units that each of the driving machines has associated therewith a fuel container which is arranged above the driving machine or the primary part of the torque converter.

For employing the motor vehicle in row cultures, especially when operating beet and potato harvesting machines with the fuel output of both driving machines, it is furthermore provided in conformity with the invention that the driving wheels of one vehicle side are with regard to the driving wheels of the other vehicle sides subdivided as to their width and that the driving wheel parts are arranged in spaced relationship to each other.

In order, when using the motor vehicle with a number of different or the same type of working implements to be able to carry out the various individual operations of movements without putting a visual load on the drive, it is suggested in conformity with the present invention that the control of the two driving units is effected selectively simultaneously or separately by a programmer. Within the framework of the invention, the adjustment of the programmer may be effected manually and/or by the output of a built-on device or a part thereof. For the uniform control of the pull-resistance of the built-on working implement or implements or for the uniform control of the working position of such implement or implements, the adjustment of the programmer may likewise be effected manually and/or by the pull resistance and/or the working position of the built-on device. For purposes of continuously taking advantage of the full machine output of one or both driving machines, it is suggested according to the invention that the adjustment of the programmer be determined by hand and/or the slip of one or more driving wheels. If a certain working program has to be carried out by the motor vehicle, the adjustment of the programmer may be effected by a program furnished, for instance, by means of punch cards, punch tapes, cam discs, or a similar information carrier. Advantageously, the programmer is arranged in or on the driver's stand.

Figure 1:
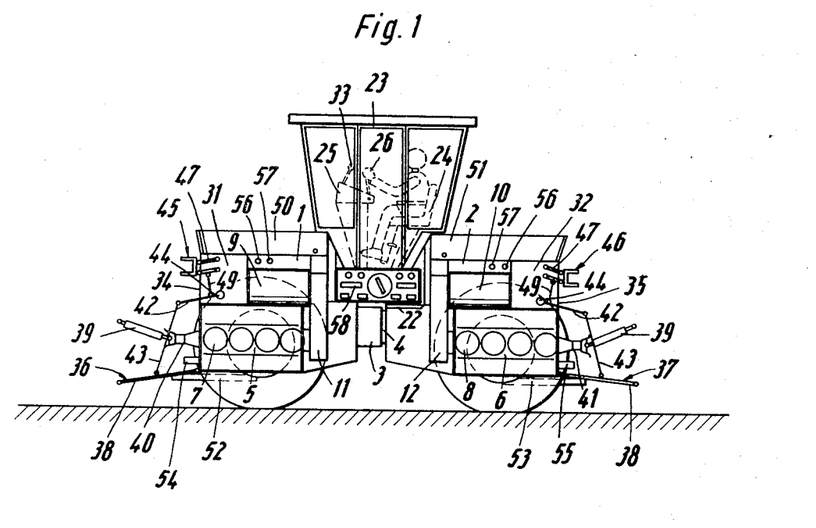
FIG. 1 illustrates a side view of a motor vehicle according to the invention.
Figure 2:
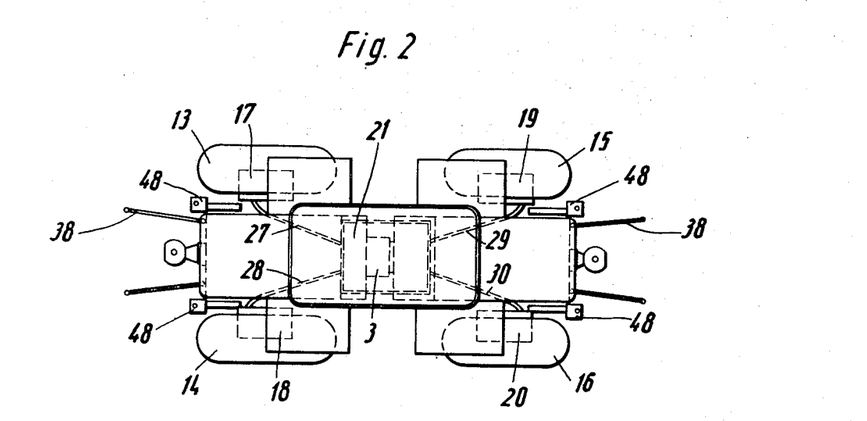
FIG. 2 shows a top view of the motor vehicle illustrated in FIG. 1.

Referring now to the drawings in detail, the motor vehicle according to FIGS. 1 and 2 has two preferably identical driving units 1 and 2 which by means of a joint 3 arranged centrally between said two units but not illustrated are coupled to each other by means of a horizontal pivot shaft 4. Each of the two driving units 1 and 2 comprises a driving machine 5, 6 respectively, which for purposes of obtaining a good vision and a low overall center of gravity of the vehicle have their cylinders 7 and 8 designed as horizontal cylinders. The crank shafts of the two driving machines are preferably parallel to the longitudinal central axis of the vehicle.

Above the driving machines 5, 6 of each driving unit there is provided one primary part each 9, 10 respectively of a torque converter which is variable as to its transmission ratio and which forms a hydrostatic converter. The drive of said torque converter is effected from the respective driving machine 5, 6 on that side which faces the joint 3 and through transmission means in the housing 11 and 12 which are not illustrated but may be in the form of gears, chains, or the like. The torque converter of each driving unit 1 and 2 in addition to comprising a primary part 9, 10 has two secondary parts which are designed as hydrostatic motors 17, 18, 19 and 20 and arranged in the driving wheels 13, 14; 15, 16. Within the scope of the present invention there exists the possibility to arrange the secondary part adjacent to the driving wheels. The arrangement of the driving machine 5, 6 and the arrangement of the primary parts 9, 10 as well as of the secondary parts 17, 18; 19, 20 is with each driving unit so selected that the common center of gravity of the individual masses thereof is located in or near a vertical plane passing through the center of the two associated driving wheels 13, 14; 15, 16.

The primary parts 9 and 10 are, through non-illustrated double hoses, connected with a control device 21 which is arranged, for instance, below the platform 22 of a driver's stand 23. The said driver's stand 23 is preferably in the center of the vehicle above the joint 3 mounted for pivoting about a non-illustrated vertical axis and may be displaceably arranged along a transverse axis. In addition to having a seat 24, the driver's stand 23 also comprises a control panel 25 which has a manually pivotable lever 26 which is movable in two planes for actuating the control device 21. Control device 21 is through double hoses 27, 28, 29, 30 connected to the associated secondary parts 17, 18, 19, 20. The control device 21 is so designed that the control of the forward and rearward direction of rotation and the changes in speed of all driving wheels 13, 14, 15 and 16 will turn simultaneously in the same direction or selectively the driving wheels associated with one vehicle side relative to the driving wheels of the other vehicle side turn for purposes of steering in opposite direction at the same or different speeds. The control of the forward and rearward drive of the secondary parts on both sides is effected by means of the manual lever 26 by pivoting the same in or in opposite direction to the driving direction whereas the steering is effected by pivoting the manual lever in a direction transverse to the driving direction. In addition thereto, the control device is so designed that by means of a non-illustrated reversing switch there will exist the possibility of driving by means of both driving machines the driving wheel or wheels of a driving unit selectively or simultaneously or separately. There will also exist the possibility to drive diagonally oppositely located driving wheels by the driving machine selectively together or separately with different or the same outputs. The control device furthermore furnishes the possibility selectively to drive the drive wheels of only one vehicle side with both driving machines with the output superimposed or to drive said driving wheels separately.

With each driving unit 1, 2, above the associated driving machine 5, 6 there are respectively arranged hydraulic power lifters 31,32. These power lifters are supplied with a pressure medium by a fluid pressure pump which is driven preferably by the primary part 9, 10 or also by each one or from a single one of the driving machines 5, 6. Both hydraulic power lifters 31, 32 are designed as to their structural height so that for assuring a favorable vision and a low structural height of the vehicle the structural height of the power lifters is substantially the same or less than the structural height of the adjacent end faces of the pertaining primary parts 9, 10. Furthermore, both hydraulic lifters 31, 32 are provided with a non-illustrated control device which by means of one or two control levers 33 arranged at the driver's stand will permit a control of a pushed or pulled implement in conformity with the pressure or pull resistance, working position and/or working depth and also in comformity with the slip or torque of the drive wheels will be permitted.

For permitting the connection of one or more implements at the end faces on both sides of the machine, each end face 34, 35 of the working unit 1, 2 is respectively provided with an implement connecting device 36, 37 forming a three-point support, which is adapted at certain working positions to be located with regard to its movability in transverse direction. Each of the three-point supporting or connecting devices 36, 37 comprises two lower links 38 which are linked to the housing of the driving machine 5, 6 or to structural elements connected thereto, by means of a non-illustrated universal joint and an upper link 39 (Lenker) adjustable in longitudinal direction. Each of the two upper links 39 is likewise by means of a universal joint linked preferably to the catching mouth of a suspending or trailer clutch 40, 41 which is directly connected to the housing of the driving machine 5, 6 so as to be adjustable as to height or is connected to the housing through the intervention of another structural element.

The lifting and lowering of the three-point connecting device 36,37 by means of the power lifter 31, 32 is effected through the intervention of two lifter arms 42 and lifter rods 43 connecting said arms 42 with the lower links 38. Preferably, the lifter arms 42 are arranged on both sides of said power lifters and mounted on a lifter shaft 44. For purposes of adjusting the transverse position of the implement to be connected to the machine, at least one of the two lifting rods 43 of each three-point support 36, 37 is adjustable as to its length. In addition to the three-point support 36, 37 which is movable in transverse direction and linked to the end face 34, 35, each end face, preferably at the level of the hydraulic power lifter 31, 32 is provided with a coupling device 45, 46 which is adapted to be lifted and lowered and serves for rigidly coupling an implement or implement part. The coupling device 45, 46 comprises a two catching members 48 each guided in a horizontal plane in spaced relationship to each other along double crank arms 47 and is adapted to be locked. The double crank arms 47 are mounted on or by means of a shaft in the housing of the power lifter 31, 32. The lower cranks are by means of preferably longitudinally adjustable lifter rods 49 coupled to the lifter arms 42 of the associated power lifters 31, 33.

Each driving unit 1, 2 furthermore above the hydraulic power lifters 31, 32 comprises a fuel container 50, 51 associated with the corresponding driving machine 5, 6 respectively. The structural length of said container or reservoir 50, 51 corresponds to the structural length of the power lifter and associated primarily with part 9, 10 in order to favorably take advantage of the space available. The fuel containers 50, 51, for purposes of easier servicing the power lifter and the primary parts are at one of its ends pivotable about a shaft which extends in a transverse direction with regard to the central longitudinal axis of the vehicle or about a shaft which extends parallel to the longitudinal central axis of the vehicle.

In addition to the above described implement connecting devices or support, each of the two driving units 1 and 2 is provided with a pull pendulum 52, 53 which is respectively linked below the driving machine 5, 6 to said driving machine or on a structural element connected thereto while being pivotable about a vertical and a horizontal axis. The pulling parts protrude beyond the end face 34, 35 and are adjustable as to length.

For purposes of driving an implement or part thereof connected to each end face 34, 35 by means of the implement connecting devices 36, 37, 40, 41, 45, 46, 52, 53, which implement may, for instance, in the nature of a lowering device, a threshing implement, etc., each end face 34, 35 is additionally provided with a stud shaft 54, 55 which is driven in conformity with the stroke and also motor speed. The stud shaft 54 is adapted to be coupled to the stud shaft 55 by any standard coupling devices in order to assure synchronism. The shafts 54 and 55 are furthermore adapted to be coupled to each other in order to assure synchronism and equalization of the driving lines of both driving machines 5 and 6.

In addition thereto, when the motor vehicle according to the invention, the end face 34, 35 for each driving unit 1, 2 and/or each vehicle side for the hydraulic or electric drive of an implement to be connected to the machine at the end face or laterally thereof, is provided with one or more electric power output connections 56 or one or more hydraulic power output connections 57.

For purposes of economically controlling the motor vehicle in a genuine one-man operation, the motor vehicle is additionally equipped with a programmer 58. The programmer 58 is intended to control the power output of the driving machines 5, 6, of the selectively same or different or superimposed power output reception of the secondary parts 17–20 and the power output reception and working depth or working position of connected implements. The programmer 58 is arranged in or near the driver's stand and is adapted to be controlled manually by means of non-illustrated levers, keys or the like. The working program of the motor vehicle is effected through the intervention of cam discs, punch cards, punched tapes or the like information carriers. The adjustment or control of the programmer 58 may furthermore be effected depending on the type of use of the motor vehicle additionally by hand, by the encountered pull resistance and/or the working position of a connected implement. For purposely exploiting to a maximum the power output of both driving machines 5, 6, the adjustment of the programmer may also be effected by receiving the power output of a connected implement or in conformity with the slip of one or more of the driving wheels 13–16.

It may be mentioned that the motor vehicle according to the FIGS. 1 and 2 may, instead of being provided with hydrostatic torque converters 9, 17, 18; 10, 19 20 which are variable as to the transmission ratio thereof, also be provided for instance with adjustable electric torque converters or with torque converters in the form of transmissions controlled by pressure-operated clutches and/or brakes. It may also be mentioned that instead of having the driver's stand 23 pivotable about a vertical axis, only the control panel 25 together with the seat 24 may be pivotable about a vertical axis. As a further alternative, in a stationary driver's stand 23, two control panels forming an image to each other and pivotable seat may be provided.

Figure 3:
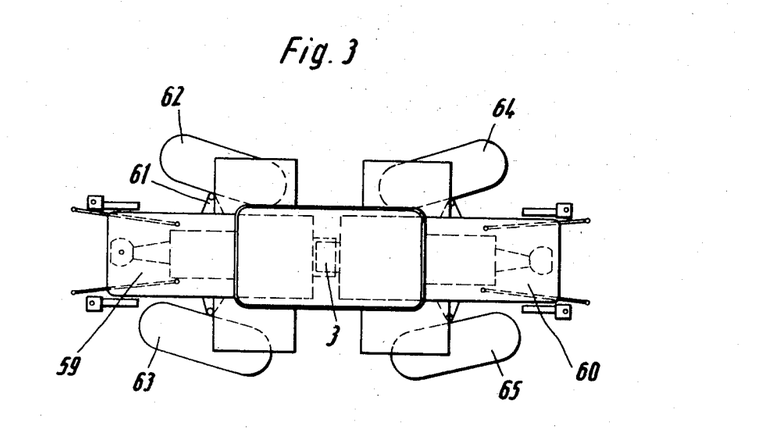
FIG. 3 represents a further embodiment of the invention with steered driving wheels.

The motor vehicle according to FIG. 3 with its two driving units 59 and 60 is provided with a horizontal joint 31, parallel to the longitudinal central axis of the vehicle. In contradistinction to the motor vehicle shown in FIGS. 1 and 2 and described in connection therewith, the driving wheels 62, 63; 64, 65 are linked through members 61 to non-illustrated frame parts or housing parts of the driving units 59, 60 while being adapted to be steered. The drive of the driving wheels 62, 65 may be effected by means of hydrostatic or electric secondary parts according to FIG. 2 which parts are arranged within said driving wheels. There also exists the possibility of arranging the non-illustrated secondary parts stationarily adjacent the driving machine 5, 6 and to drive the driving wheels over flexible shafts. With both suggested solutions, the arrangement of the secondary parts should be such that the center of gravity of the mass, the associated primary part and the driving machine 5, 6 is located in or in the vicinity of a vertical plane passing through the two drive wheel centers. Furthermore, the steering of the driving wheels 62, 63; 64, 65 is to be effected through a common or a double steering wheel which is arranged at the driver's stand 23 and acts through the intervention of servo-members upon the axle members 61.

Figure 4:
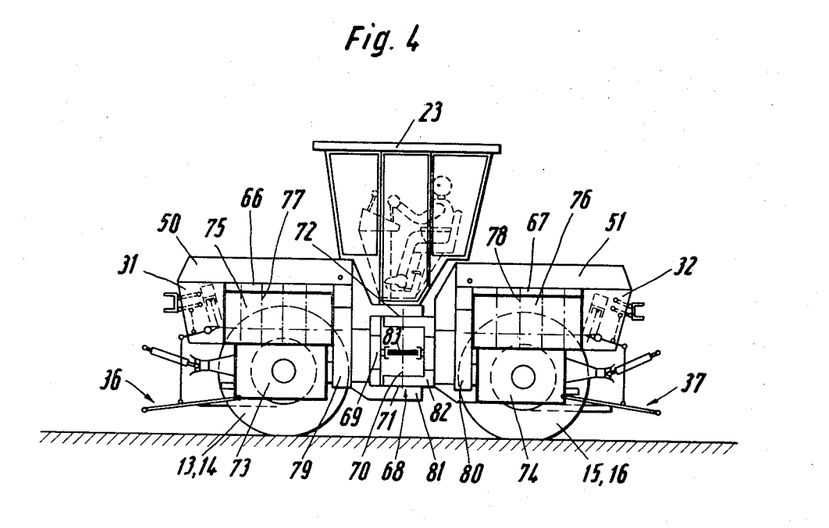
FIG. 4 is still another modification of a motor vehicle according to the invention with driving units coupled by means of a cross joint.

FIG. 4 shows a modification over the heretofore discussed designs. More specifically, FIG. 4 illustrates a motor vehicle according to the invention in which the two driving units 66, 67 are coupled to each other through a cross joint 68. The cross joint 68 has a horizontal pivot shaft 69 extending parallel to the central vehicle axis and also has a vertical pivot axis 70 which is preferably located in the center between the two driving units 66 and 67. The vertical pivot shaft 70 is formed by a bearing 71 and 72 the base of which is located preferably within the structural height resulting from the adjacent torque converters 73, 74 adjustable as to its transmission ratio and of the driving machines 75, 76 arranged above said converters 73, 74. The driving machines 75 and 76 are in contra-distinction to the previously described arrangements so designed that their cylinders 77, 78 are in upright position. For purposes of simplifying the power withdrawal, the crankshafts are arranged parallel to the vehicle central axis. The arrangement of the driving machines 75, 76 and of the torque converters 73, 74 is in conformity with the invention so located that the common center of gravity of the individual masses is located in or near a vertical plane passed through the center of the two associated driving wheels 13, 14; 15, 16. The torque converters 73 and 74 may, similar to the arrangement of FIG. 1, be designed as hydrostatic torque converters with one or two pump parts and two secondary parts one of which is associated to one driving wheel each. Furthermore, there exists the possibility to design the torque converters 73 and 74 which are adjustable as to their transmission ratio, as purely mechanical transmissions with clutches or couplings adapted to be shifted under load and/or with brakes, or in the form of electric converters with one or two dynamo parts and two secondary parts in the form of electric motors one of which will again be associated with one driving wheel each. The power transmission from the driving machine 75, 76 to the primary part of the torque converter 73, 74 is again effected by non-illustrated driving members journalled in housing parts 79, 80 and associated with the joint 68. The housing parts 79, 80 likewise serve as connecting member for the fork-shaped joint parts 81, 82 of the cross joint 68. Extending through the free space of the fork-shaped joint parts 81, 82 are one or more drive shafts 83 or other power transmission members in the form of double hoses between the two driving units. A driver's stand 23 is rotatably arranged on the vertical bearings 72 of the fork-shaped joint part 81. The axis of rotation of said driver's stand 23 is coaxial with the vertical pivot shaft 70. The driver's stand 23 is provided with devices corresponding to those described in connection with FIG. 1. In addition thereto, the driver's stand 23 has a non-illustrated control device for actuating the likewise non-illustrated hydraulic steering cylinders which bring about a folding of the cross joint 68 about the vertical pivot shaft 70. In addition to the described devices, the motor vehicle according to FIG. 4 is similar to the device described in FIGS. 1 and 2 at the end face provided with the same implement-connecting devices 36, 37, 40, 41, 45, 46, 52, 53 and with the same power transmitting devices 54, 55, 56, 57 as well as stud shafts and the like. The hydraulic power lifters 31, 32 are designed in the same manner as described in connection with FIG. 1.

Figure 5:
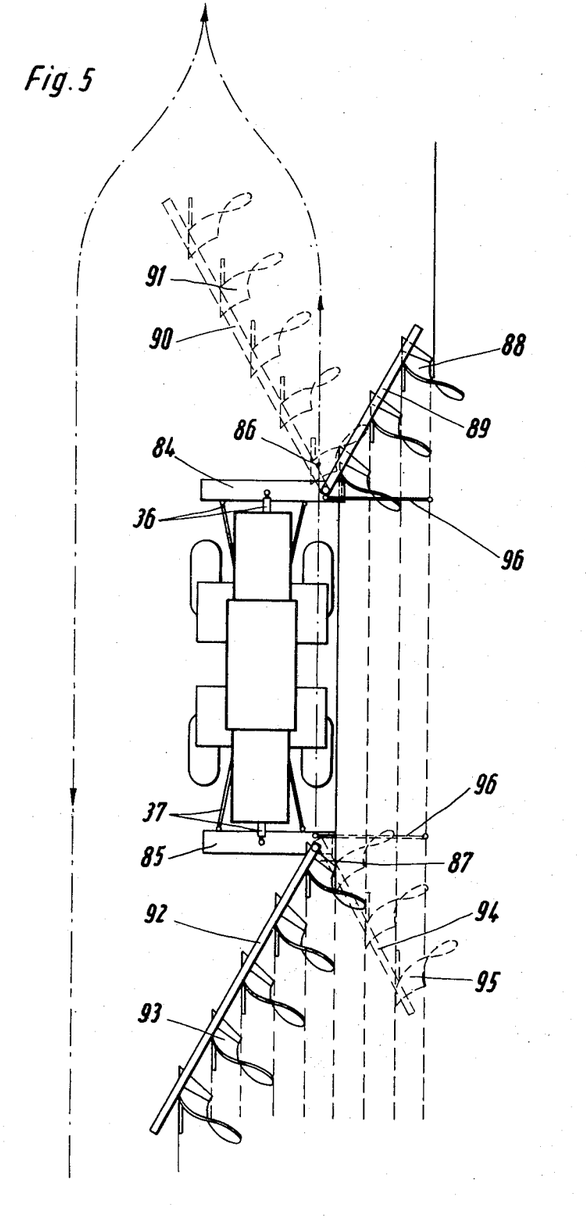
FIG. 5 shows a motor vehicle according to the invention with plows installed on both end faces.

FIG. 5 illustrates a motor vehicle according to the present invention with a rotary plow 86, 87 which at the end face of the motor vehicle is connected to the three-point support 36, 37 through the intervention of a frame 84, 85, said plows 86, 87 being non-symmetric. The plow 86 comprises for instance three plow bodies 88 which are shown in pushed working position and are rightward turning. These plow bodies 88 are mounted on a plow beam frame 89 which is rotatable about a non-illustrated pivot axis by 90°. The plow 86 furthermore comprises a plow beam frame 90 with five leftwardly turning plow bodies 91 for the pulling operation. The rotary plow 87 comprises five rightwardly turning plow bodies 93 illustrated in pulled working condition which are arranged on a plow beam frame 92 which is pivotable about a non-illustrated horizontal pivot axis. The rotary plow 87 furthermore comprises a plow beam frame 94 pivotable about the same pivot axis and provided with three leftwardly turning plow bodies 95 for the pushing, plowing operation.

As will furthermore be evident from FIG. 5, the motor vehicle according to the invention will in view of this arrangement of the plow bodies drive on the non-plowed ground, in other words, no longer in a groove, since the wide tires necessary for large pulling forces require either very wide plow bodies or a portion of the plowed groove would again be tamped. In view of the arrangement of the plow bodies, approximately one-third of the plow bodies in operation is being pushed, whereas the major portion is being pulled. By employing the illustrated non-symmetric plows 86, 87, there no longer exists the necessity for the motor vehicle to turn at the end of the grooves. Instead the vehicle merely is, at the end of the groove when changing its direction, offset by the entire working width so that a new groove is started (angefahren). For facilitating this operation with regard to the new groove, each rotary plow 86, 87 is provided with a track indicator 96. The plow bodies of the rearward drive are indicated by dash lines. The turning of the rotary plows 86, 87 is to be effected from the driver's stand through hydraulic control members which are not illustrated. Furthermore, it is to be mentioned that with such a plow arrangement, the two driving wheels which are arranged on that side of the vehicle which faces the plowed ground, are subjected to a greater load than the three driving wheels of the other vehicle side. This is, however, compensated for by the fact that by means of the control device 21 described in connection with FIGS. 1 and 2, the secondary parts associated with the driving wheels subjected to a higher load, are supplied with approximately 80 percent of the driving power, whereas the secondary parts of the oppositely located driving wheels receive the remainder of 20 percent of the driving power.

Figure 6:
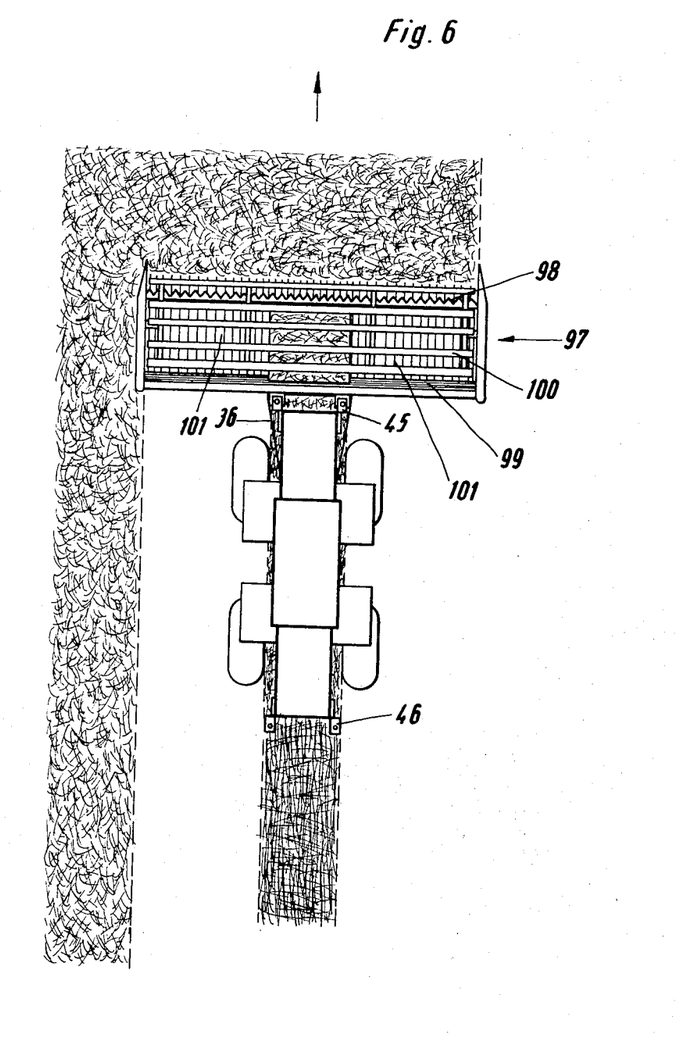
FIG. 6 represents a motor vehicle according to FIGS. 1-4 with a rigid front mowing mechanism which is adapted to be lifted and lowered and with a smoke layer.

FIG. 6 shows a modification of FIG. 5. More specifically, the motor vehicle according to FIG. 6 is provided with a pushed window mower 97 (Schwadmaeher) which is rigidly coupled to said motor vehicle by means of the coupling devices 36 or 37 and additional devices 45 or 46. In view of the high driving power of the motor vehicle according to the present invention, there exists the possibility to design the mower 97 with a multiple width of the motor vehicle. The mower 87 itself consists of a cutting mechanism 98, a mowing table 99, a rake capstan (Rechenhaspel) and two counter moving conveyor belts 101 by means of which the cut goods are in an advantageous manner in the form of one strip (Schwad) deposited between the clear track width of the driving wheels of the motor vehicle according to the invention. Since, with such front assembly or front implement, the driving wheels facing the pushed implement are under a higher load than the rear implements, more power from the primary parts of the torque converter is fed into the secondary parts of the driving wheels which are under the greater load. This is effected by means of the hydraulic control device referred to in connection with FIGS. 1 and 2.

Figure 7:
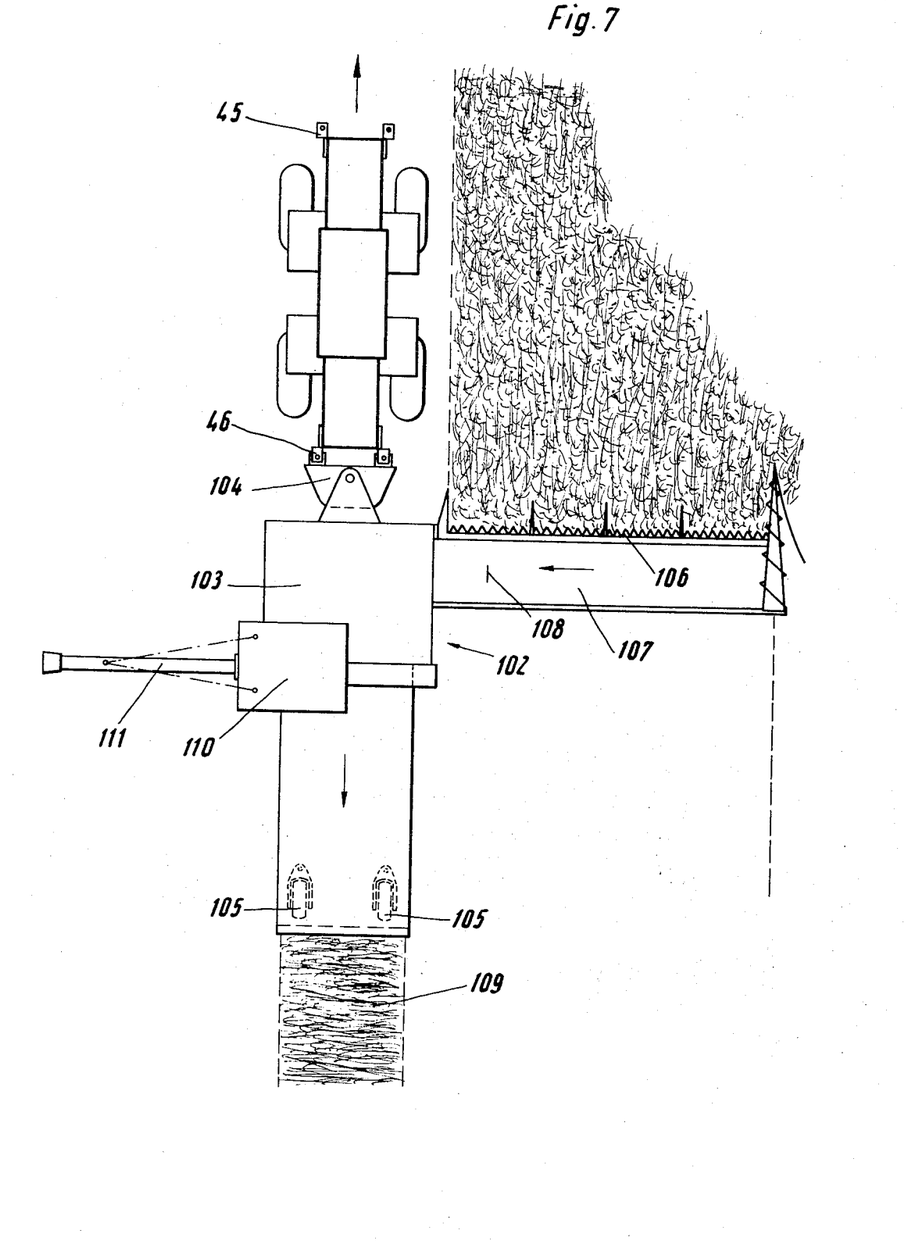
FIG. 7 is a motor vehicle according to FIGS. 1-4 with a built-on mow-threshing unit.

FIG. 7 shows a motor vehicle according to the invention with a pulled and saddled mowing thresher 102 which has no driving machine of its own and has no driver's stand of its own. The mowing thresher comprises a threshing unit 103 with threshing, vibrating and sifting device which through a cross joint 104 controllable hydraulically similar to a buckling control (Knicklenkung) and has a vertical and horizontal pivot axis, is coupled to the coupling members 46 or 47 of the motor vehicle and is supported thereby. The rearward support of the threshing unit 103 is effected at the rear end by means of one or two pivotable rollers 105. The mowing thresher 102 comprises a cutting mechanism 106 with a mowing table 107 and a conveyor belt 108 which conveys the cut material into the threshing unit 103. The cut material following the threshing, vibrating and sifting device leaves the mowing thresher 102 via its rear portion and deposits the same in the form of a strip 109. The threshed grain which is received in a collecting container 110 is by means of the conveyor 111 transferred into a vehicle drive adjacently thereto. The drive of the cutting mechanism 106 may be effected by means of hydrostatic or electrical driving members which receive their power from one or both of the driving machines of the driving units through non-illustrated power transferring members which are in communication with corresponding power withdrawing connections 56 and 57 of the motor vehicle. In a similar manner, from the same power withdrawing connections 56, 57 or from the shafts 54, 55, the infinitely variable threshing drum drive as well as the drive of the vibrator and screens may be withdrawn from the motor vehicle. The adjustment of the adjusting members of the mowing thresher 102 with regard to its speed and oscillations of the threshing drum, cutting mechanism, vibrator, screen and wind purifier and degrainer (Entgranner) and the elevation of the mowing mechanism and windless may be effected from the driver's stand 23 through the intervention of the programmer 58 in order to reduce the work of the operator and thereby permit the operation of the machine by a single operator. The programmer may be preloaded in conformity with the type of grain, the position and the ground conditions. A program change as it may for instance be caused by a change in the weather can be effected immediately by a different punch card. Furthermore, it is to be mentioned that in view of the illustrated cross joint connection 104 of the mowing thresher 103 with the motor vehicle according to the invention, minimum turning circles can be obtained which may be controlled hydraulically. In addition thereto, with the device according to the invention, the secondary parts of the driving wheels of the motor vehicle which are closest to the mowing thresher 102 may be effected from control device 21 in conformity with the power primarily absorbed from said driving wheels in conformity with this pulling operation.

Figure 8:
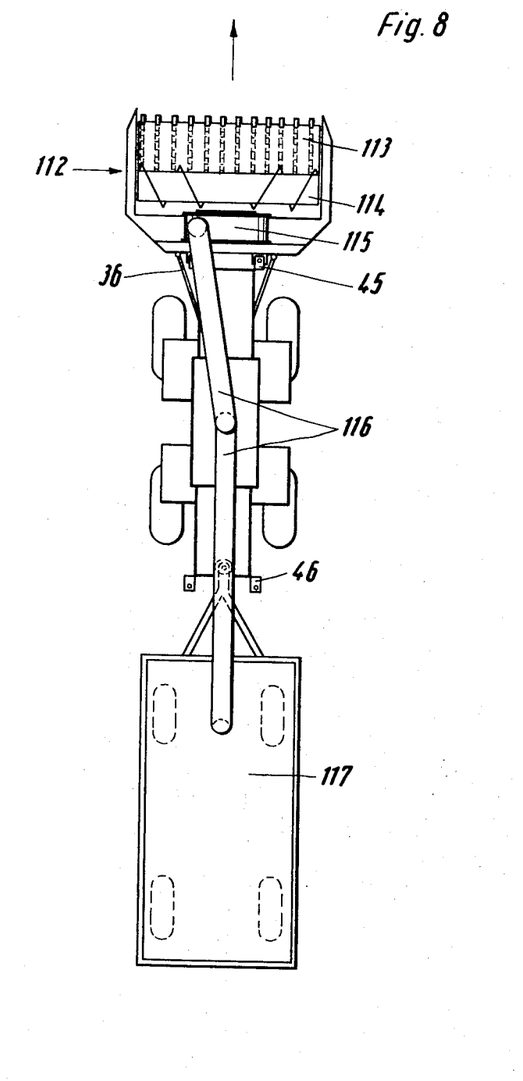
FIG. 8 is a motor vehicle according to FIGS. 1-4 with a pickup mechanism and chopped straw producing mechanism connected to an end face and arranged to be pushed and with a pulled trailer part.

FIG. 8 shows a motor vehicle according to the invention with a rigidly connected field straw cutter 112 which is connected by means of the coupling device 46 or 47 and which comprises a receiving roller 113, a draw-in worm 114 and, for instance, a blowing chopper 115. From the chopper 115, through a pipe 116, the chopped material such as grain, fodder, hay or straw is conveyed over the motor vehicle and laterally thereof and also below the same to a loading cart or the like 117 which is connected to the coupling 40, 41. The driver who is seated centrally on the pivotable or rotatable seat 24 can clearly view the implements in front as well as the loading cart on the side of the vehicle.

Figure 9:
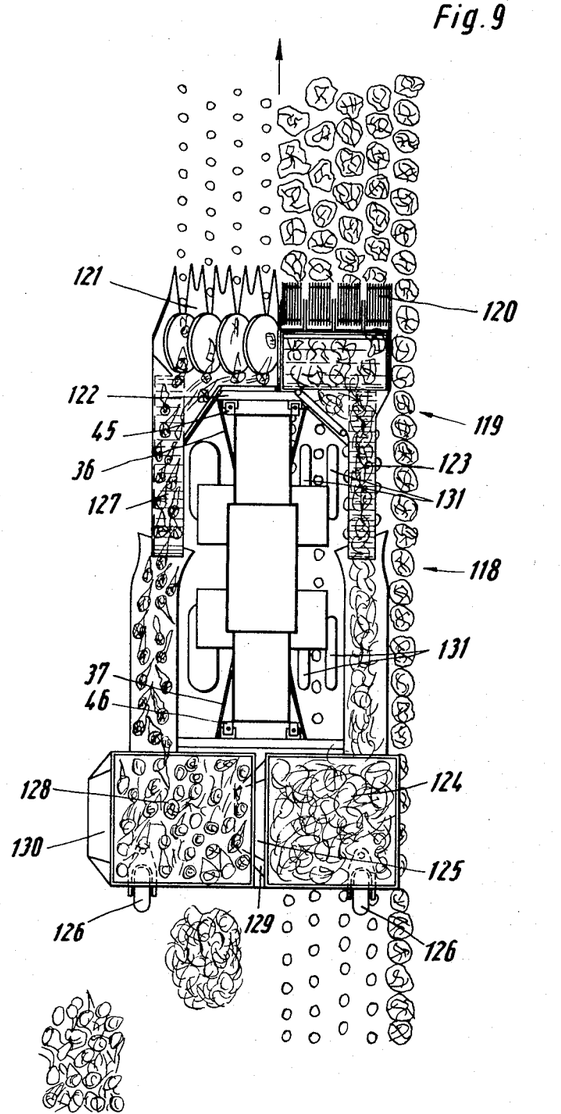
FIG. 9 illustrates a motor vehicle according to FIGS. 1-4 with a beet full harvesting machine connected thereto and comprising a front and a rear part.

FIG. 9 shows a motor vehicle according to the invention with a two-sectional beet full harvesting machine 118. The harvesting machine 118 comprises a front section 119 which has a topping device 120 and a digging device 121. The device 120 and the device 121 are coupled to the implement coupling device 46 through the intervention of connecting members 122. The leaf material is conveyed from the topping device 120 via a conveyor belt 123 to the chamber 124 of a bin 125 which has two pivotable rollers 126 and which by means of the coupling members 47 is built onto one end face of the motor vehicle. The dug beets are by means of conveyor belts, such as screen chains 127 conveyed into a chamber 128 of the bin 125. The chambers 124 and 128 of the bin 125 are provided with discharging devices 129, 130, which are actuated either from the driver's stand 23 or automatically. It is expedient to empty the chambers 124, 128 by a lateral or rearward tilting. In the illustrated embodiment, the driving wheels behind the topping device 120 are designed as twin tires 131 with an intermediate chamber which is dimensioned in conformity with the thickness of the beets so that a destroying or squashing in rolling over the beets to be dug will be avoided while, on the other hand, the full driving power is in conformity with the wide non-divided tires conveyed to the ground.

Figure 10:
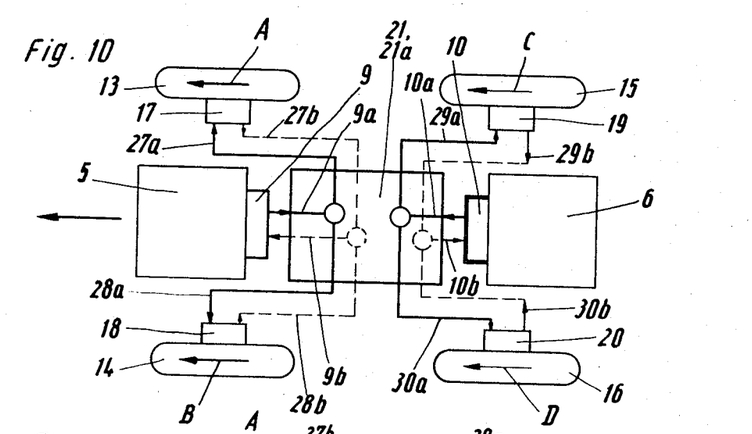
FIG. 10 represents the driving diagram of a motor vehicle according to the invention.

As described in connection with FIGS. 1–9, in some instances of employment of the motor vehicle according to the invention, it may be necessary for an economical exploitation of its power to drive certain driving wheels with the same power or different power of the driving machines of the two driving units. To this end, the motor vehicle will be equipped with a hydrostatic drive according to FIG. 10 the structure of which corresponds substantially to the structure of the hydrostatic drive described in connection with FIGS. 1 and 2. The control device 21 is, in this instance, however, additionally provided with a partially non-illustrated quantity dividing or differential device 21a the control possibilities of which will be explained in connection with FIGS. 11–21. The control device 21 is supplied with a fluid pressure from the primary part 9 through a pressure conduit 9a and from the primary part 10 through a pressure line 10a. The return of the pressure medium from the control device 21 or quantity divider 21a is effected through a conduit 9b to the primary part 9 and through a conduit 10b to the primary part 10. The secondary parts may additionally be connected to the control device 21 by means of additional control lines.

The control device 21 or the quantity divider 21a are furthermore through a pressure conduit 27a in communication with the secondary part 17, furthermore through a pressure line 28a to the secondary part 18, through a pressure line 29a with the secondary part 19 and through a pressure line 30a with the secondary part 20. Connected to the control device 21 and the quantity divider 21a are the secondary parts 17–20 through corresponding return lines 27b, 28b, 29b and 30b. As will be seen from FIG. 10, for the corresponding driving wheels, the power absorption of the secondary parts 17 is illustrated as vector A and the power absorption of the secondary part 18 is illustrated as vector B of the same magnitude. Accordingly, the power absorption of the secondary parts 19, 20 is illustrated with vectors C, D respectively of the same magnitude.

Figure 11:
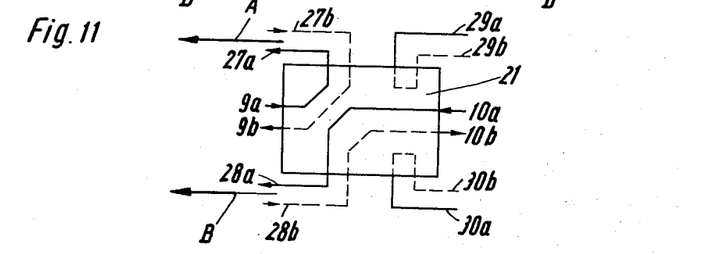
FIGS. 11-21 represent further driving possibilities of the individual driving wheels of the motor vehicle.

By means of the control device 21 in conformity with FIG. 11 there also exists the possibility from primary part 9 to convey the full quantity of pressure fluid exclusively to the secondary part 17 so that here illustrated by a double long vector A a 100 percent power absorption from the driving machine 5 of the driving unit 1 is obtained. The secondary part 18, however, in conformity with FIG. 11 is through the control device 21 actuated by the full delivery from the primary part 10 so that here, illustrated by a double long vector B likewise a 100 percent power absorption of the driving machine 6 of the driving unit 2 is obtained. The two secondary parts 19 and 20 will, however, with this arrangement of the control device rotate idly.

Figure 12:
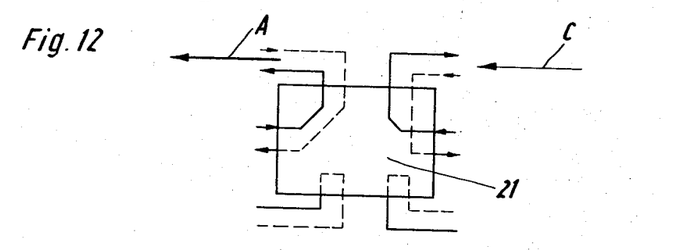

According to a further modification of the adjustment of the control device 21, according to FIG. 12 an arrangement will be obtained so that again from the primary part 9 100 percent of the power output of the driving machine 5 acts exclusively on the secondary part 17 which means that the vector A is of the same length as in FIG. 11. However, from the primary part 10, which means from the driving machine 6, 100 percent of its full power output acts upon the secondary part 19. Vector C will have the same length as vector A. The secondary part 18 and the secondary part 20 rotate idly.

Figure 13:
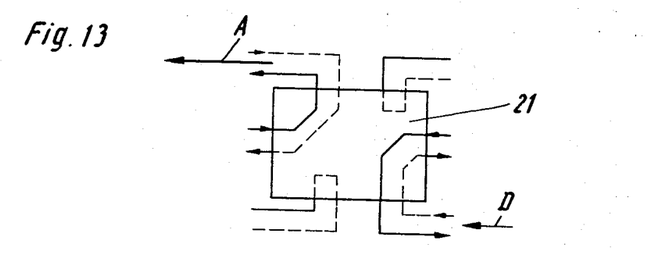

With the arrangement of FIG. 13, through the control device 21, again 100 percent of the output of the driving machine 5 is conveyed to the secondary part 17, whereas 100 percent of the output of the driving machine 6 acts upon the secondary part 20. Vectors A and D are of the same size. The diagonally oppositely located secondary parts 18 and 19 will in this instance rotate idly.

Figure 14:
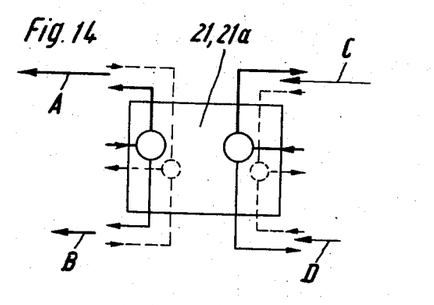

In the control position of the control device 21 and the quantity divider 21a as shown in FIG. 14, three-fourths of the driving output of the driving machine 5 is from the primary part 9 conveyed to the secondary part 17 while the remaining one-fourth is conveyed to the secondary part 18. Similarly, the secondary part 19 receives three-fourths of the output of the driving machine 60 from the primary part 10, whereas the secondary part 20 receives the remaining one-fourth. Vectors A and C are of the same magnitude but are shorter than in FIGS. 11–13. This shortening is expressed by the smaller vectors B and D which are of the same magnitude.

Figure 15:
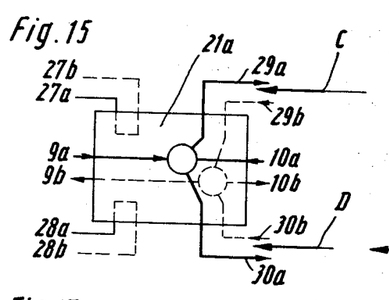
Figure 16:
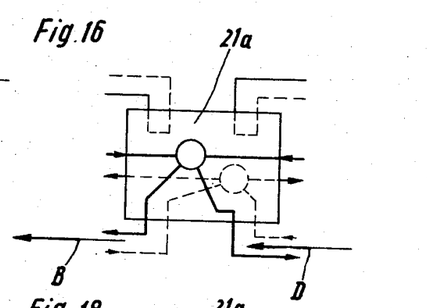

From FIG. 15 it will be seen that the control device and the quantity divider 21a may also be so adjusted that from the primary part 9 the output of the driving machine has superimposed thereon the output of the driving machine 6 from the primary part 10 whereupon one-half is conveyed to the secondary part 19 and the other half is conveyed to the secondary part 20. FIG. 16 shows an adjustment of the quantity divider 21a according to which the output of the driving machine 5 and 6 has superimposed the output from the corresponding primary parts 9 and 10 and one of the total of this output is conveyed to the secondary part 18 while the other half is conveyed to the secondary part 20.

Figure 17:
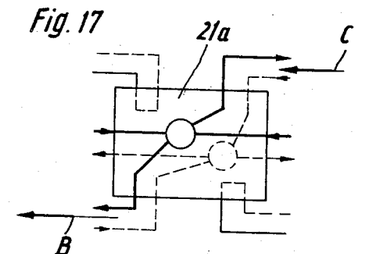

In conformity with FIG. 17, the quantity divider of the control device feeds the output of the two driving machines 5 and 6 which is conveyed from the two primary parts 9 and 10 into said quantity divider into the diagonally oppositely located secondary parts 18 and 19 so that each of these parts receives one-half of the said total output.

Figure 18:
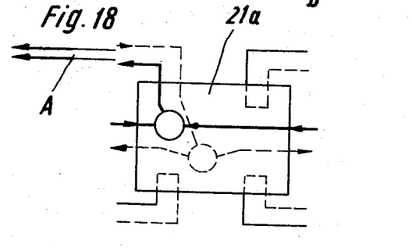

FIG. 18 shows that is is possible through the quantity divider 21a to feed the total output of the two primary parts 9 and 10 by the pressure medium thereof solely to a primary part, for instance, 17.

Figure 19:
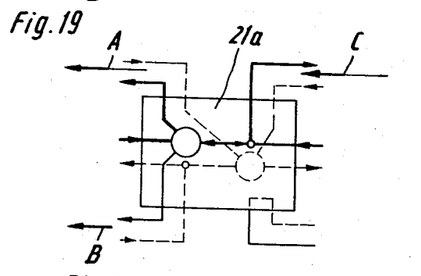

According to FIG. 19, the quantity divider 21a is so adjusted that from the driving machine 5 through the primary part 9 thereof and from the driving machine 6 through the primary part 10 thereof simultaneously, i.e. in superimposed condition, the power output is fed to a different extent into the three secondary parts. The secondary part 17 receives one-third of the driving machine output of the driving machine 5 plus one-half of the driving machine output of the driving machine 6. The secondary part 19 likewise receives one-third of the driving machine output of the driving machine 5, and the remaining half of the driving machine output of the driving machine 6 plus the remaining third of the driving machine output of the driving machine 5 is conveyed to the secondary part 18.

Figure 20:
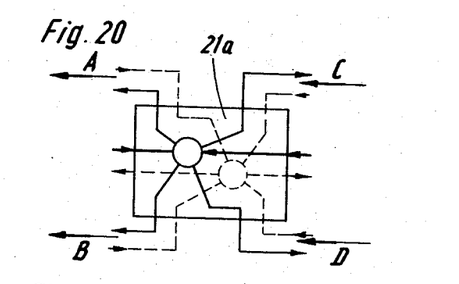

FIG. 20 shows a possible control of the control device 21 with quantity divider 21a in which one-fourth each of the superimposed total output of the driving machines 5 and 6 is conveyed to the secondary parts 17-20.

Figure 21:
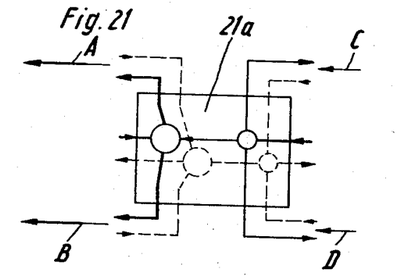

Finally, in conformity with FIG. 21, it is possible by means of the quantity divider 21a to provide a control position according to which for instance the secondary parts 17, 18 receive one-half of the output of the driving machine 5 plus superimposed thereupon one-fourth of the driving machine output of the driving machine 6. The remaining half of the output of the driving machine 6 is in this instance conveyed to the secondary parts 19 and 20 each receiving one-half. Naturally, these control positions may furthermore be varied and may be applied to the other secondary parts accordingly also in opposite driving direction.

It may also be mentioned that when initiating a motor vehicle according to the invention with a converter which is designed as electric torque converter with a corresponding transmission ratio, a power output division or power output superimposition is possible in conformity with FIGS. 10-21. This applies to direct current as well as 3 phase alternating current.

It is, of course, to be understood that the present invention is, by no means, limited to the particular constructions shown in the drawings but also comprises any modifications within the scope of the appended claims.

What is claimed is:

1. A drive vehicle especially adapted for agricultural use and comprising: a frame, a pair of ground wheels on the frame at each end thereof, a drive unit mounted in each end of the frame and each drive unit comprising a drive engine, said engines being adapted for being coupled together for transmission of power therebetween, each drive unit comprising torque transmitting means and each said torque transmitting means including a primary part drivingly connected to the respective engine having a vertical range respectively, said torque transmitting means also comprising secondary parts adapted for receiving power from said primary parts, and connection means on said frame at each end thereof for connection to an implement which is to derive power from the vehicle, each said engine and the respective said primary part being arranged in superimposed relation in said frame, each said engine and the pertaining torque transmitting means taken together having a center of gravity near the vertical plane passing through the center of the pair of wheels on the same end of said frame, each said connection means comprising a power operable implement lifting and draft linkage.

2. A drive vehicle according to claim 1, in which each said linkage is disposed within the vertical range of the adjacent said primary part.

3. A drive vehicle according to claim 1, in which each said linkage is disposed within the vertical range of the adjacent said drive engine.

4. A drive vehicle according to claim 1, in which each said linkage includes coupling means for rigid connection to an implement.

5. A drive vehicle according to claim 4, in which each said coupling means is in the form of a fork opening away from the vehicle and held in parallel relationship by said linkage while being moved in the vertical direction by said linkage.

6. A drive vehicle according to claim 5, in which each linkage comprises a pair of laterally spaced lower arms pivoted to the frame and extending therefrom, each coupling means being connected to an upper arm of said linkage, and lifter rods connecting each said upper arm to the respective said lower arms.

7. A drive vehicle according to claim 6, in which each linkage includes a housing supported on the adjacent drive unit, said upper arms being pivotally supported on said housing.

* * * * *